May 22, 1962  F. R. BELL ET AL  3,035,878
FLEXIBLE SUPPORTING ARRANGEMENT FOR ROTATING MEMBERS
Filed Feb. 5, 1960  2 Sheets-Sheet 1

INVENTORS
FRANCIS R. BELL
GEORGE E. PREECE
BY
Holcombe, Wetherill & Brisebois
ATTORNEYS.

United States Patent Office 3,035,878
Patented May 22, 1962

3,035,878
FLEXIBLE SUPPORTING ARRANGEMENT FOR ROTATING MEMBERS
Francis Robert Bell and George Edward Preece, London, England, assignors to The De Havilland Engine Company Limited, Leavesden, England, a company of Great Britain
Filed Feb. 5, 1960, Ser. No. 6,903
Claims priority, application Great Britain Feb. 9, 1959
6 Claims. (Cl. 308—143)

This invention relates to a flexible supporting arrangement for a rotating member which is axially loaded, for example a flexible end support for a rotary shaft subject to axial thrust.

An object of the invention is to provide a flexible support for a rotary member such as a shaft which will not only support a part or the whole of the axial load on the shaft, but will also allow slight tilting of the shaft about a transverse axis at or near the support, for example to enable the shaft to take up or maintain alignment with respect to an associated member.

According to the present invention, in a flexible supporting arrangement for a rotary member which is axially loaded, such as a shaft, the member is anchored to a fixed anchorage against the axial load by the combination of a laterally-yielding flexible elongated support member and a rotary thrust bearing, the flexible support member being longitudinally unyielding under the axial load transmitted through it. Thus the support member may be connected between the fixed anchorage and the non-rotary part of the thrust bearing, whilst the cooperating rotary part of the thrust bearing is secured to the part of the rotary member to be supported, the support member thereby permitting slight tilting of the thrust bearing in conformity with small angular movements of the loaded member.

Where for example the loaded rotary member is a vertical or nearly vertical shaft subject to an axial load in the downward direction and required to be suspended from its upper end, the flexible support member may comprise a flexible tension link such as a flexible cable or rod, disposed substantially along the line of action of the load and placed in tension thereby.

Again, the flexible support member may comprise a resilient strut placed in compression by the load, for example being disposed beneath the lower end of a loaded upright shaft to support it and the whole or a part of the load.

Figure 1:
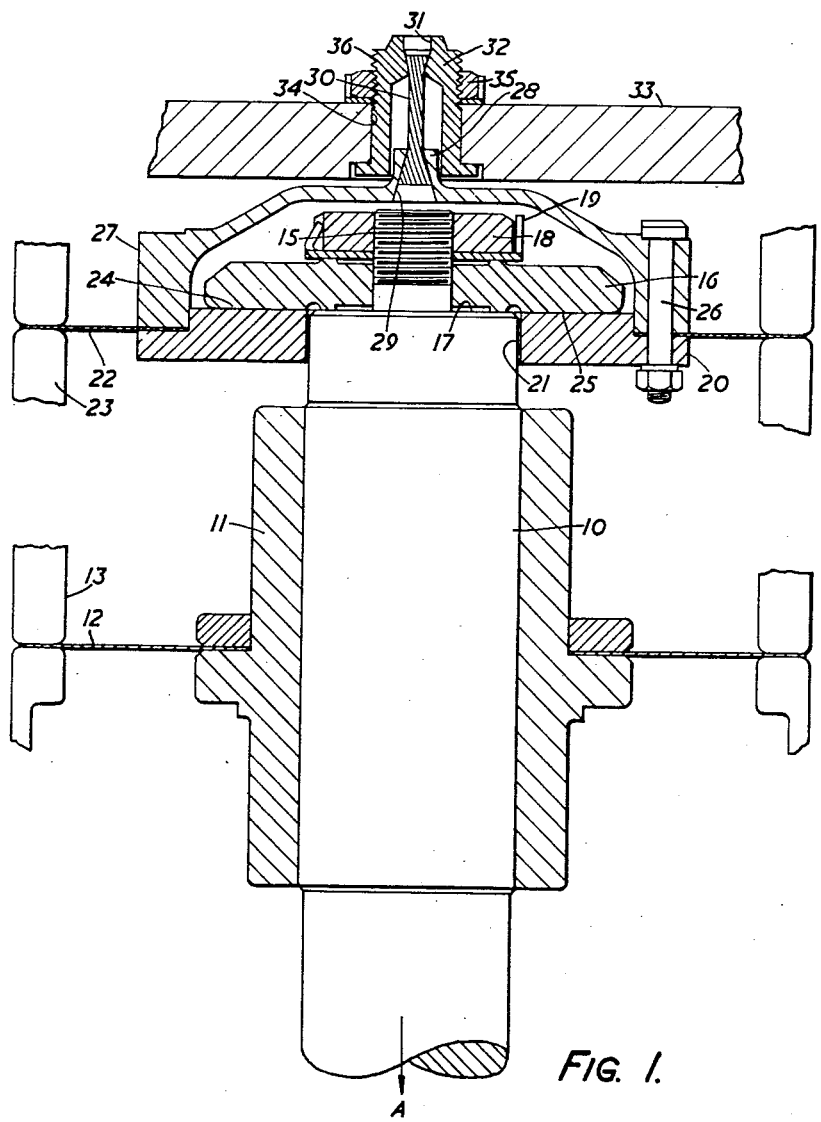
Figure 2:
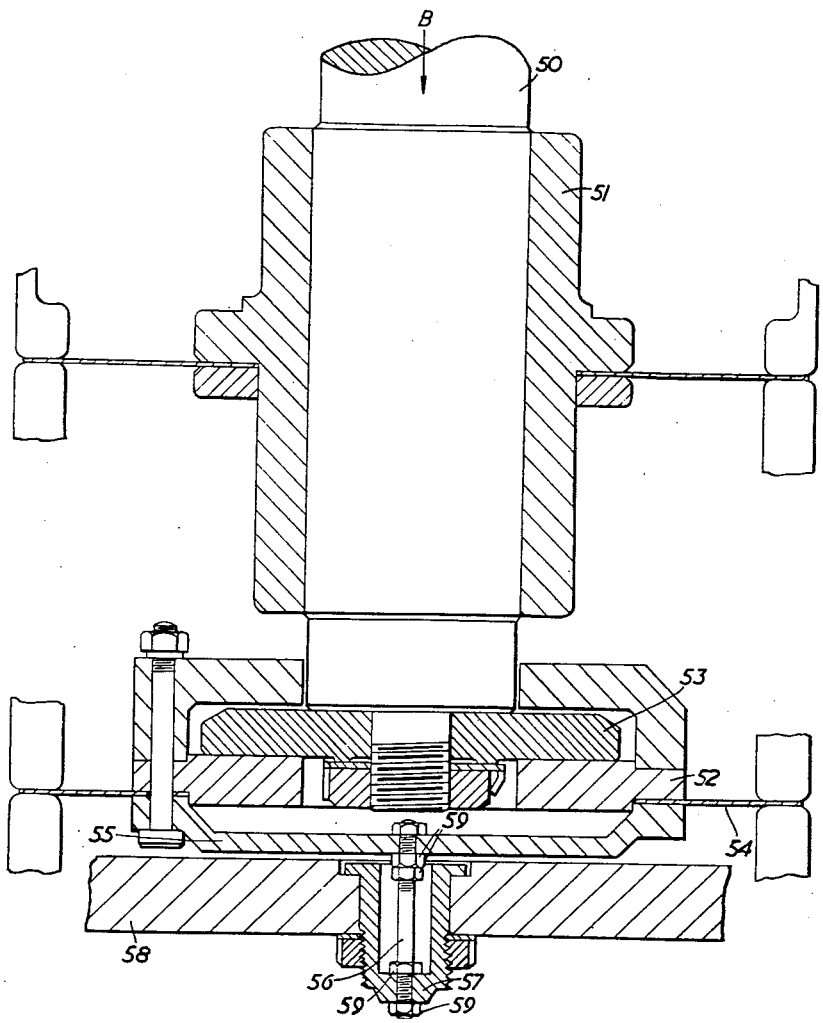

The invention may be carried into practice in various ways but two specific embodiments will now be described by way of example with reference to the accompanying drawings in which FIGURE 1 is a sectional side elevation of a flexible bearing support at the upper end of an upright rotary shaft, and FIGURE 2 is a sectional side elevation of a modified flexible bearing support for the lower end of an upright rotary shaft.

The embodiment of FIGURE 1 comprises a flexible end support and suspension for the upper end of an upright shaft 10 mounted for rotation in one or more flexibly-mounted steady-bearings 11 which allow the shaft 10 to undergo small tilting movements.

The shaft 10 is subject to a downward gravitational or other applied load whose line of action is coaxial with the shaft as indicated by the arrow A. Each steady-bearing 11 comprises a sleeve member 11 lubricated in any convenient manner, for example a self-acting gas-lubricated or air-lubricated bearing of known design. The sleeve member 11 is secured in the centre of a surrounding flexible diaphragm 12 whose peripheral edge is clamped to a fixed annular support 13.

The vertical shaft 10 is formed at its upper end with a reduced-diameter portion 15 formed with an external screw thread, which receives and locates a thrust plate 16 which is clamped against a shoulder 17 near the end of the shaft by means of a nut 18 and locking washer 19 screwed on to the threaded end portion 15 of the shaft 10. The thrust plate 16 rotates with the shaft 10 and constitutes one part of an end bearing assembly comprising a thrust bearing, the co-operating part of which is afforded by a stationary thrust plate 20 formed with a central bore 21 which coaxially surrounds the upper end of the shaft 10, the stationary thrust plate 20 being supported by means of a flexible diaphragm 22 whose peripheral edge is clamped to the surrounding fixed anchorage 23. The diaphragm 22, which provides radial location of the stationary thrust plate 20 and also allows slight tilting of the plate 20, may be dispensed with in many cases. The stationary plate 20 of the thrust bearing is provided with a plain upper surface 24 which underlies and supports a corresponding plain lower bearing surface 25 of the rotary thrust plate 16 so that the latter and the suspended shaft 10 are partly or wholly supported on the stationary thrust plate 20 whilst remaining free to rotate. Although the two thrust plates 16 and 20 of the thrust bearing have been described as having plain mating surfaces, which may be gas-lubricated, other forms of thrust bearing may be employed to suit different requirements.

The peripheral edge of the stationary thrust plate 20 is bolted by bolts 26 to a domed suspension cover or spider 27 which overlies the thrust bearing 16, 20 and the end of the shaft. The steady diaphragm 22 for the thrust bearing is clamped between the stationary thrust plate 20 and the suspension cover 27 by means of the bolts 26 which secure these together. The precise configuration of the suspension cover 27 may be varied to suit various requirements, but its upraised central portion is provided with a central boss 28 formed with a generally conical central bore or passage 29 which is tapered in the upward direction and receives the lower end of a short flexible wire cable 30, the end of the cable being fastened in the conical bore 29, for example by opening out its strands and soldering, to form an anchorage preventing the cable end being pulled upwardly out of the bore 29. The main length of the cable 30 extends upwardly through the upper end of the conical bore 29, and its upper end is secured in a similar manner to an oppositely tapered conical bore 31 formed in a threaded bush 32. A fixed anchorage in the form of supporting beam 33 is provided with a recessed bore 34 which accommodates the bush 32, the position of the bush being adjusted axially by means of a nut 35 threaded on to an external screw thread 36 on the bush and resting on the upper surface of the supporting beam 33. Thus the whole assembly comprising the bush 32, the flexible cable 30, the suspension cover 27, the thrust bearings 16, 20 and the suspended shaft 10 can be raised and lowered or adjusted to a predetermined level by adjustment of the nut 35 of the supporting bush 32.

Thus it will be seen that the flexible cable 30 constitutes a lateraly yielding elongated flexible support member and can be tensioned by means of the adjusting nut 35 so that it will support either the whole or the major part of the load A, the cable 30 accommodating any slight tilting movements of the shaft about a transverse axis through the thrust bearing 16, 20. This form of end suspension is particularly useful in cases where the shaft is a depending shaft which can only be inserted through one end of a surrounding housing.

Whilst the flexible support 30 has been described as being afforded by a short length of flexible cable, it will be clear that other forms of flexible tension member, for example a thin metallic rod similar to a bicycle wheel spoke, may also be used.

FIGURE 2 illustrates another modified embodiment in which the lower end of an upright shaft 50 subject to a coaxial load B in the downward direction is supported by means of a flexible end bearing arrangement. As before, the shaft 50 is guided by a steady bearing 51 secured to a fixed annular support and is provided at its lower end with a thrust bearing 52, 53 similar to that of the bearing 16, 20 of FIGURE 1. The non-rotary plate 52 of the bearing is steadied by a resilient diaphragm 54 also secured to a surrounding fixed anchorage and is bolted to a suspension cover 55 to whose centre is secured the upper end of a short resilient strut 56. The lower end of the strut 56 is secured to the base of a bush 57 anchored to a fixed anchorage in the form of supporting beam 58. The two ends of the resilient strut 56 are screw-threaded and are attached respectively to the suspension cover 55 and to the bush 57 by means of cooperating nuts 59 as shown in the drawing.

Thus in this embodiment the whole or part of the load B to which the shaft 50 is subject is transmitted via the thrust bearing 52, 53 to the upper end of the resilient strut 56 which comprises a laterally yielding elongated flexible support member and whose lower end is anchored by the bush 57 to the supporting beam 58, so that the strut 56 supports the whole or part of the load B whilst permitting slight tilting movements of the lower end of the shaft 50.

It will be understood that whilst both the embodiments described and illustrated relate to shafts which are orientated in vertical or generally upright positions, they may equally well be employed with axially loaded shafts which are in other than upright orientations, for example inclined at a substantial angle to the vertical or even horizontally arranged. In each such case the axial load is transmitted to the non-rotary anchorage through the thrust bearing and the flexible tension link or strut, placing the flexible member in tension or compression as the case may be.

What we claim as our invention and desired to secure by Letters Patent is:

1. In combination, a rotary shaft member subject to a load which is substantially coaxial with its axis of rotation, an end bearing assembly supporting the rotary shaft member against the force of the load, and a steady bearing supporting said shaft at a point intermediate its length, the said end bearing assembly comprising a rotary thrust bearing including cooperating rotating and non-rotating bearing parts together with a single laterally-yielding but longitudinally unyielding elongated flexible supporting member secured between one of the thrust bearing parts and a fixed anchorage, and said steady bearing being secured to a flexible diaphragm which extends in a plane transverse to the axis of rotation of the rotary shaft member and surrounds the steady bearing, the diaphragm having an inner edge secured to the steady bearing and an outer edge secured to a fixed annular support.

2. An arrangement as claimed in claim 1 in which the flexible support member is connected between the fixed anchorage and the non-rotary part of the thrust bearing, whilst the cooperating rotary part of the thrust bearing is secured to the part of the rotary member to be supported.

3. An arrangement as claimed in claim 1 in which the rotary member is subject to an axial load in the downward direction and is suspended at its upper end from the fixed anchorage by the said combination of flexible support member and thrust bearing.

4. An arrangement as claimed in claim 3 in which the flexible support member comprises a length of flexible cable or rod, aligned with the line of action of the load.

5. An arrangement as claimed in claim 1 in which the member is subjected to an axial load in the downward direction and is supported at its lower end by the said combination of flexible support member and thrust bearing, the flexible support member comprising a resilient strut placed in compression by the load.

6. An arrangement as calimed in claim 1 in which the non-rotary part of the thrust bearing is itself anchored to a surrounding fixed anchorage by a flexible diaphragm extending in a plane transverse to the axis of rotation of the rotary member.

References Cited in the file of this patent

UNITED STATES PATENTS 2,684,877    Schneider _____ July 27, 1954

FOREIGN PATENTS 2,266    Great Britain _____ 1909